(12) United States Patent
Provost

(10) Patent No.: US 7,362,827 B2
(45) Date of Patent: Apr. 22, 2008

(54) SYSTEM AND METHOD FOR THE DEMODULATION OF IFF SIGNALS

(75) Inventor: Claude Provost, Laval (FR)

(73) Assignee: Thales (FR)

( * ) Notice: Subject to any disclaimer, the term of this patent is extended or adjusted under 35 U.S.C. 154(b) by 629 days.

(21) Appl. No.: 10/405,039

(22) Filed: Apr. 2, 2003

(65) Prior Publication Data

US 2003/0214608 A1    Nov. 20, 2003

(30) Foreign Application Priority Data

Apr. 5, 2002   (FR) .................................. 02 04265

(51) Int. Cl.
   *H04L 27/22* (2006.01)
(52) U.S. Cl. ....................... 375/329; 375/334; 329/300
(58) Field of Classification Search ........ 375/316–332, 375/279–280, 284, 272; 329/304, 306–308, 329/300
   See application file for complete search history.

(56) References Cited

U.S. PATENT DOCUMENTS

| | | | | |
|---|---|---|---|---|
| 4,608,540 A | * | 8/1986 | Tsuchiya et al. ............ | 329/306 |
| 5,089,822 A | * | 2/1992 | Abaunza et al. .............. | 342/30 |
| 5,586,147 A | * | 12/1996 | Kreuzgruber et al. ....... | 375/324 |
| 5,627,526 A | * | 5/1997 | Belcher et al. ............. | 375/283 |
| 5,896,060 A | * | 4/1999 | Ovard et al. ................ | 329/304 |
| 6,178,207 B1 | | 1/2001 | Richards et al. | |
| 2002/0118774 A1 | * | 8/2002 | Scheffler .................... | 375/334 |

FOREIGN PATENT DOCUMENTS

| | | |
|---|---|---|
| EP | 1189073 A2 | 3/2002 |
| WO | WO 0205454 A2 | 1/2002 |

\* cited by examiner

*Primary Examiner*—Khanh C. Tran
(74) *Attorney, Agent, or Firm*—Lowe Hauptman Ham & Berner, LLP

(57) ABSTRACT

A method for the decoding of a signal in an interrogation/response type of communications system, the received signal being formed by a video signal and a signal containing the data, wherein the method comprises at least the following steps: 1) transposing the received data signal to an intermediate frequency Fl to obtain the signal $S_{dh}(Fl)$, $S_{db}(Fl)$, 2) converting the intermediate frequency analog signal into a digital signal, 3) sampling the digital signal $S_{dh}(Fl)$, $S_{db}(Fl)$ at a given frequency Fe to obtain the signal $S_{eh}$, $S_{eb}$, 4) transmitting the sampled signal $S_{eh}$, $S_{eb}$ as well as the video signal $S_{vh}$, $S_{vb}$ to a processing step so as to determine the initially received signal. The method can be applied to the demodulation of MSK, FSK, DPSK type waveforms.

4 Claims, 4 Drawing Sheets

000# SYSTEM AND METHOD FOR THE DEMODULATION OF IFF SIGNALS

BACKGROUND OF THE INVENTION

1. Field of the Invention

The present invention relates to a method and a device that can be used especially to demodulate the signals received in an interrogator-responder type of communications system.

The invention can be applied for example for the demodulation of IFF (Identification Friend or Foe) signals using different waveforms, such as those of MSK (Minimum Shift Keying), DPSK (Differential Phase-Shift Keying), FSK (Frequency Shift Keying) etc.

2. Description of the Prior Art

In interrogation-response type communications systems, for example of the IFF type, the devices are generally dedicated to a particular encoding technique. This implies the development of a device with applications-specific components.

In the IFF field, for example, different waveforms may be used. The modulations used classically are listed in the following table.

| Type d'interrogation/response | Modulation |
| --- | --- |
| Interrogations/Responses Modes 1, 2, 3/A, B, C, D, test and Mode 4 | Pulses |
| Mode S Interrogations | Pulses + DPSK (Differential Phase-Shift Keying) |
| Mode S Responses | PPM (Pulse Position Modulation) type pulses |
| Mode 5 Interrogations/Responses | Pulses + MSK (Minimum Shift Keying) |

At present, each type of modulation has a decoding technique associated with it.

FIG. 1 shows an exemplary demodulation chain used for DPSK modulation. This chain comprises, for example, two reception antennas, one high antenna $1h$ and one low antenna $1b$, referenced as a function of their position in the receiver, a 'Dual Transponder/Interrogator Receiver' (DTIR) unit and a signal processor unit Ts. To decode DPSK-modulated signals, a delay line or a Costa loop, for example, is used in the reception chain.

The analog signals exchanged in the communications system are received on the high antenna $1h$ and on the low antenna $1b$ of the receiver of the communications system. The signal $S_h$ received by the high antenna and the signal $S_b$ received by the low antenna are processed identically. For reasons of simplification of the description, only the sequencing of the processing steps carried out on the signal $S_h$ shall be explained in detail. To obtain a description of the processing of the signal $S_b$, it is enough to replace the index h by the index b corresponding to the low antenna.

The analog signal $S_h$ is mixed, in a mixer $3h$, at a mixing frequency $F_m$ whose value is equal, for example, to 960 MHz or to 1090 MHz. At the end of this step, a signal $S_h(Fl)$ is generated at an intermediate frequency Fl of about 60 or 70 MHz. The mixing frequency value Fm generated by the local oscillator 4, substantially corresponds, for example, to the value of the frequency of response of the system. The signal $S_h(Fl)$ thus obtained is then transmitted to a device $5h$ whose function especially is to separate the signal into a video signal $S_{vh}$ and a limited intermediate frequency signal $S_{dh}$ containing the data. This signal $S_{dh}$ is independent of the power received at the antenna. The video signal $S_{vh}$ is transmitted directly to a processing card 10 (along the channel V in the figure). A switch 6 is used to select the signal to be processed. It is controlled, for example, by the video signal $S_{vh}$ or $S_{vb}$. The data signal $S_{dh}(Fl)$ is sent to the switch 6, then to a delay line 7 adapted to producing two signals, offset with respect to each other in time. These two signals, $S_{dh}(t)$, $S_{dh}(t+\tau)$ respectively have a phase shift $\Delta\phi$. They are sent in a mixer 8 which determines the value of the phase shift $\Delta\phi$. This phase shift is then transmitted to a comparator 9 set to a decision threshold D, which thus generates a binary signal formed by zeros and ones. This binary signal $S_{bh}$ is transmitted to the processing card 10 which thus receives the video signal $S_{vh}$ and combines these two signals to determine the signal $S_h$ received by the high antenna $1h$.

These processing steps are also applied to the demodulation of the signal $S_b$ received at the low antenna.

FIG. 2 shows an exemplary prior art reception chain for the MSK Mode 5.

The first Dual Transponder/Interrogator Receiver (DTIR) part is identical to that of FIG. 1 and shall therefore not be described for FIG. 2.

At output of the Dual Transponder/Interrogator Receiver (DTIR) device, the intermediate frequency signals $S_{dh}(Fl)$ and $S_{db}(Fl)$ and the corresponding video signals $S_{vh}$, $S_{vb}$ are processed as follows:

The video signal $S_{vh}$, $S_{vb}$ is directly transmitted to the processing card 10 (along the channel V)

The intermediate frequency signal $S_{dh}(Fl)$ and $S_{db}(Fl)$ is transmitted to an I, Q type demodulator referenced $12h$, $12b$, which works at a frequency delivered by a local oscillator 11. It may also have its own integrated clock. At output of the demodulator, the signal is filtered and amplified by an appropriate device $13h$, $13b$. The signals I and Q thus obtained are transmitted to the processing card 10, which also receives the video signal $S_{vh}$, $S_{vb}$ and combines these two signals to obtain the information corresponding to the decoded signal.

SUMMARY OF THE INVENTION

The object of the invention relates especially to a system and a method used to obtain data corresponding to the signal decoded by the IFF system whatever the type of modulation used for communications.

The invention relates to a method for the decoding of a signal in an interrogation/response type of communications system, the received signal being formed by a video signal and a signal containing the data, wherein the method comprises at least the following steps:

1. Transposing the received data signal to an intermediate frequency Fl to obtain the signals $S_{dh}(Fl)$, $S_{db}(Fl)$,
2. Converting the intermediate frequency analog signal into a digital signal,
3. Sampling the digital signal $S_{dh}(Fl)$, $S_{db}(Fl)$ at a given frequency Fe to obtain the signal $S_{eh}$, $S_{eb}$,
4. Transmitting the sampled signal $S_{eh}$, $S_{eb}$ as well as the video signal $S_{vh}$, $S_{vb}$ to a processing step so as to determine the initially received signal.

The value of the sampling frequency Fe is for example such that, for each signal sample, the phase state is different during a binary period.

The step 2) is executed either by using a comparator with a fixed threshold value producing a binary signal, or by means of an analog-digital converter (ADC) giving a digital signal, the video signal being then sampled by means of an ADC.

The method uses at least one of the following waveforms: MSK, DPSK, or FSK type waveforms.

The invention also relates to a system for the decoding of a signal in an interrogation/response type of communications system, a receiver adapted to converting the received signal into a video signal and an intermediate frequency signal, wherein the system comprises at least the following elements:

a device adapted to converting the intermediate frequency analog signal into a digital signal, a device enabling the digital signal to be sampled at a frequency Fe, a device for processing the sampled signal Fl and the video signal to determine the initially received signals.

The invention has especially the following advantages:

the system thus obtained can easily be adapted to the waveforms or the modulation used, the components used in the decoding chains are easily modified. The adaptation to changes in waveform is done, for example, by a modification of the signal-processing algorithm.

BRIEF DESCRIPTION OF THE DRAWINGS

Other features and advantages shall appear more clearly from the description of an exemplary embodiment given by way of an illustration that in no way restricts the scope of the invention along with the appended figures of which.

MORE DETAILED DESCRIPTION

For a clear understanding of the object of the invention, the following description is given in the context of a demodulation of a DPSK-modulated or MSK-modulated analog signal in an IFF type interrogation/response system.

In most of the presently used IFF receivers, the intermediate frequency signal Fl is at 60 MHz. This frequency corresponds to the difference between the interrogation frequency (1030 MHz) and the response frequency (1090 MHz). The example given by way of an illustration that in no way restricts the scope of the invention relates to a reception chain in which the value of the intermediate frequency Fl is about 70 MHz. The digital processing operations for these two frequencies are substantially identical. They differ especially in the value of the sampling frequency and the coefficients of the filters used, such a change being within the scope of those skilled in the art.

Figure 3:
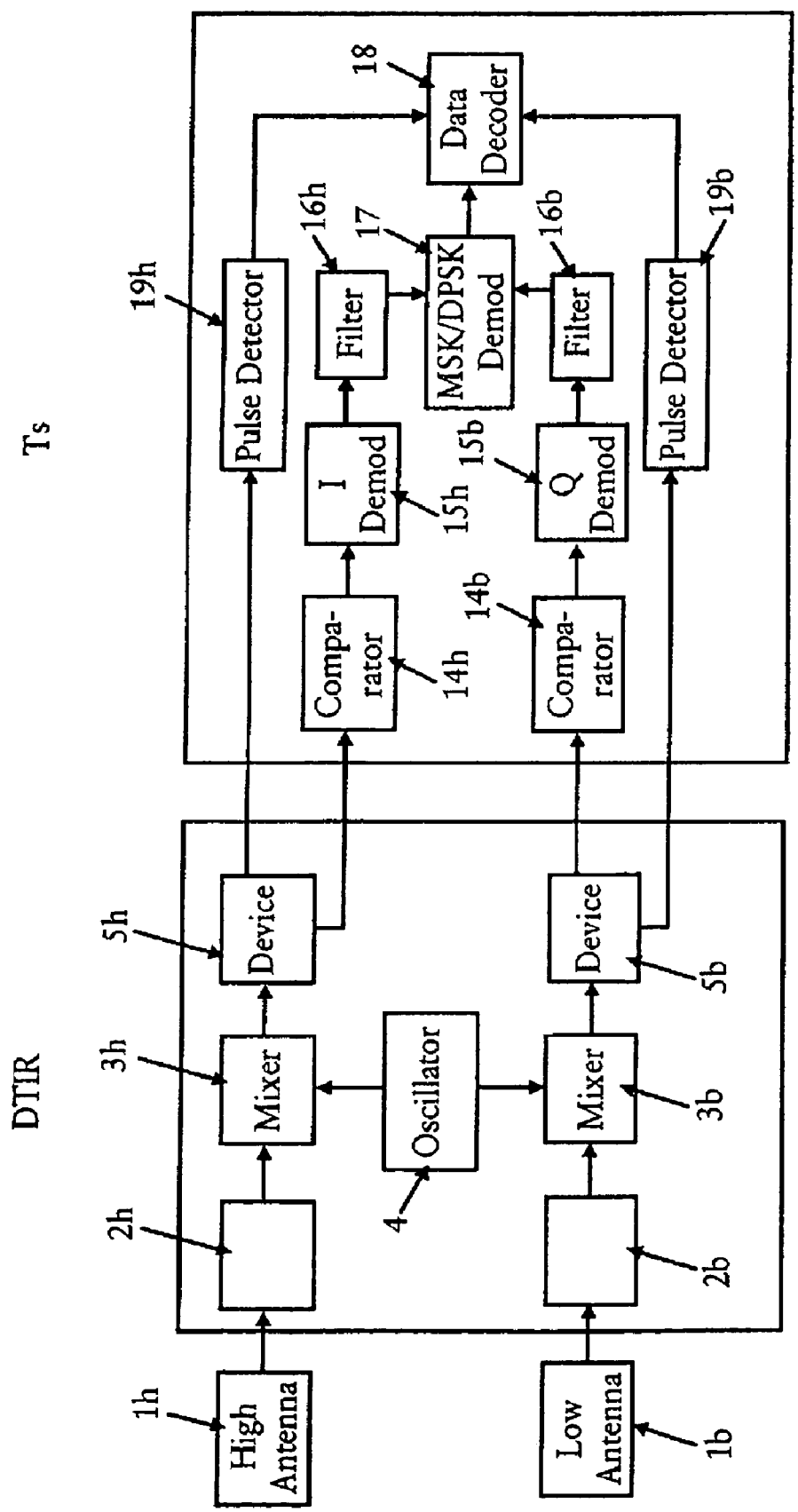
FIG. 3 is a block diagram of a reception chain according to the invention.

FIG. 3 gives a schematic view of an exemplary block diagram of reception chain according to the invention.

Figure 1:
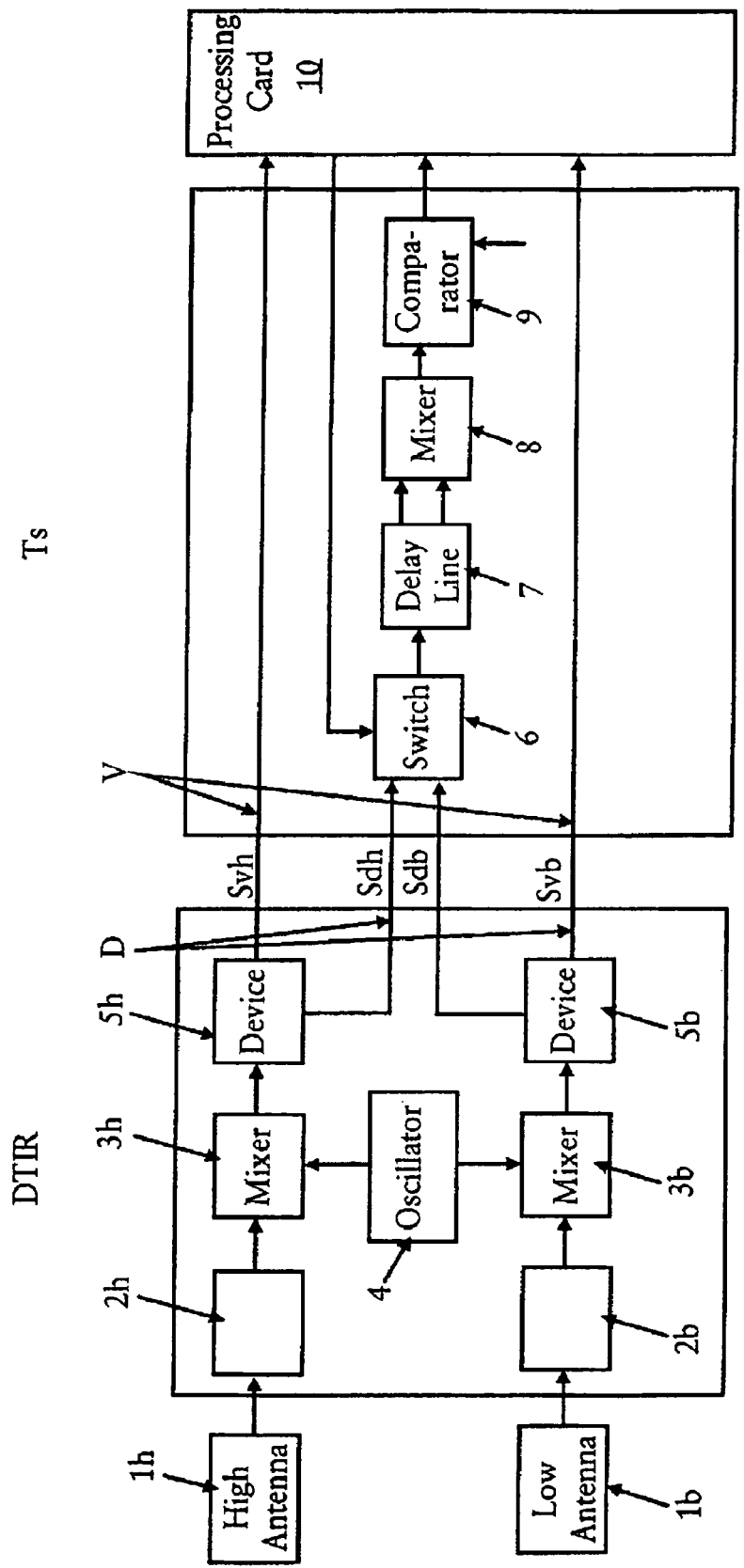
FIG. 1 exemplifies a reception chain according to the prior art for the DPSK modulation, FIG. 2 exemplifies a reception chain according to the prior art for the MSK modulation.
Figure 2:
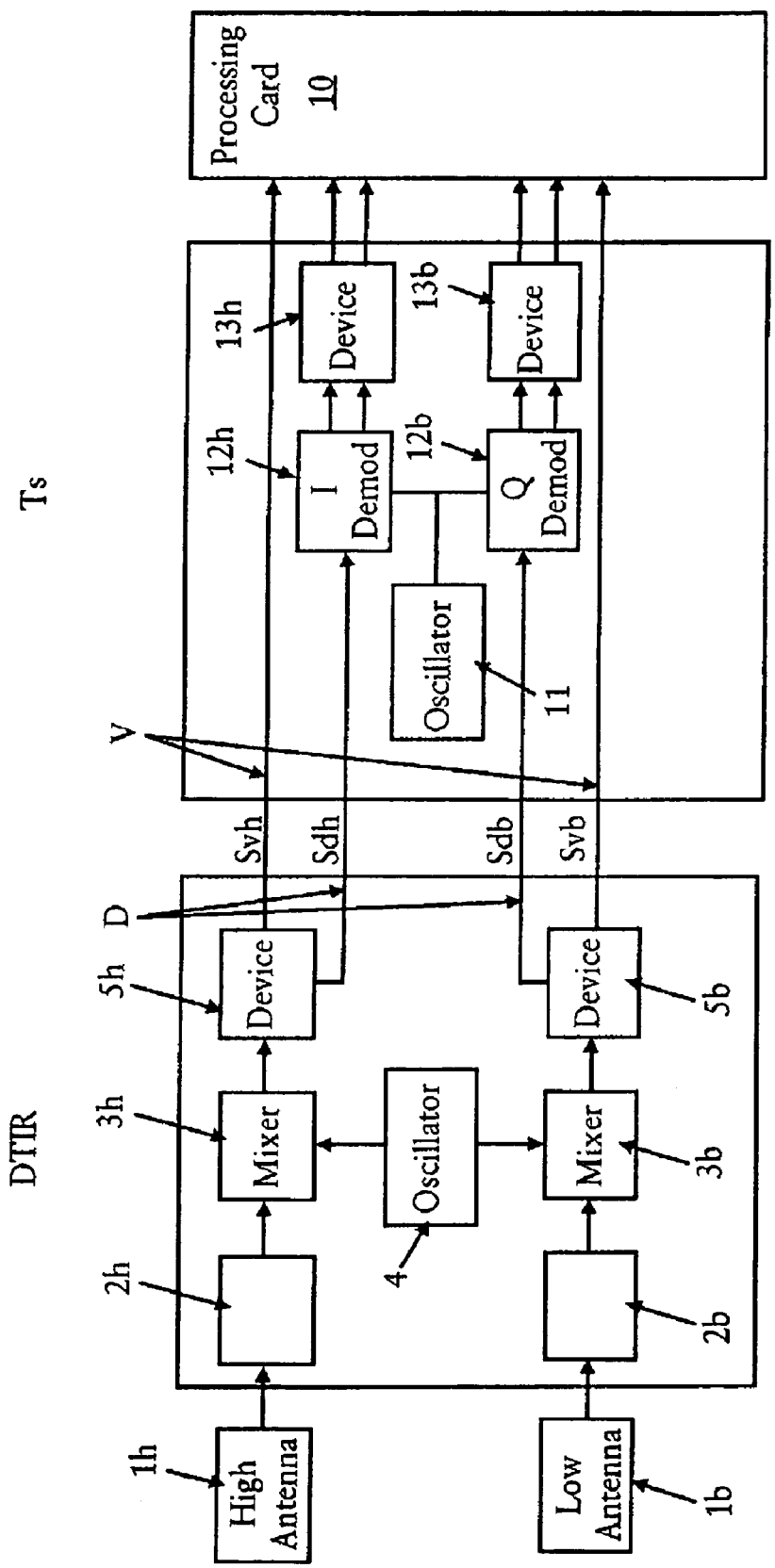

At output of the DTIR block, according to the method, there are two video signals $S_{vh}$, $S_{vb}$ and two intermediate frequency signals, Fl, containing the payload information $S_{dh}$, $S_{db}$. These signals respectively correspond to the signals received at the high antenna 1h and at the low antenna 1b of the receiver of the IFF system. The components identical to the elements described in FIGS. 1 and 2 bear the same references.

In order to simplify the description, only the steps for processing the analog signal $S_h$ received at the high antenna h are explained. For a description of the signal $S_b$ received at the low antenna 1b, it is enough to replace the index h by the index b.

As described in detail here above, the analog signal received by the antennas 1h and 1b is processed in the DTIR unit. At the end of this processing, step, there is an intermediate frequency analog signal $S_{dh}$(Fl) and a video signal $S_{vh}$.

The signal $S_{dh}$(Fl) corresponding to the payload information for the IFF system, for example the data, the information on the identification of the responding objects, etc., is transmitted to a device 14h adapted to converting this analog signal into a binary signal. This device is, for example, a comparator 14h having a threshold D set for example as a function of the characteristics of the signal $S_{dh}$(Fl). The digital signal is then sent to an I, Q type demodulator referenced 15h, where it is sampled at a frequency Fe. Then it is sent to a filter 16h adapted to readjusting the frequency of the sampled signal $S_{eh}$ towards a frequency included in the frequency band of the initial signal S. The readjusted signal $S_{rh}$ is transmitted to a demodulator 17 (for example of the correlation type known to those skilled in the art), at whose output the original binary string of the signal, $S_{bh}$ is produced. This binary string $S_{bh}$ can be demodulated, for example, by the data decoder 18 according to the method described in the patent EP 0 661 555 B1 filed by the present applicant.

The video signal $S_{vh}$ is transmitted to a pulse detector 19h and to the data decoder 18. The video signal is used, for example, as a validation and synchronization signal. This validation signal is used, for example, to inhibit the processing when no signal is received or when the received signal is inconsistent with a known signal. This makes it possible to overcome the effects of interference and limit the rate of false alarms. The video signal is used especially to know the form or envelope of the signal.

The data decoder 18 determines the original signal $S_h$ received by the high antenna from the video signal $S_{vh}$ and the binary signal $S_{bh}$. It is capable, for example, of determining the data contained in the message exchanged during the interrogation-response operation, the identifier of the responder object, etc.

The sampling frequency Fe (at the comparator) is chosen for example as a function of the intermediate frequency Fl used in the IFF system. The coefficients of the filters used may be chosen with reference to the value of the intermediate frequency.

The sampling frequency Fe may be chosen so that, for each sample, it has a different phase state during a binary period.

Figure 4:
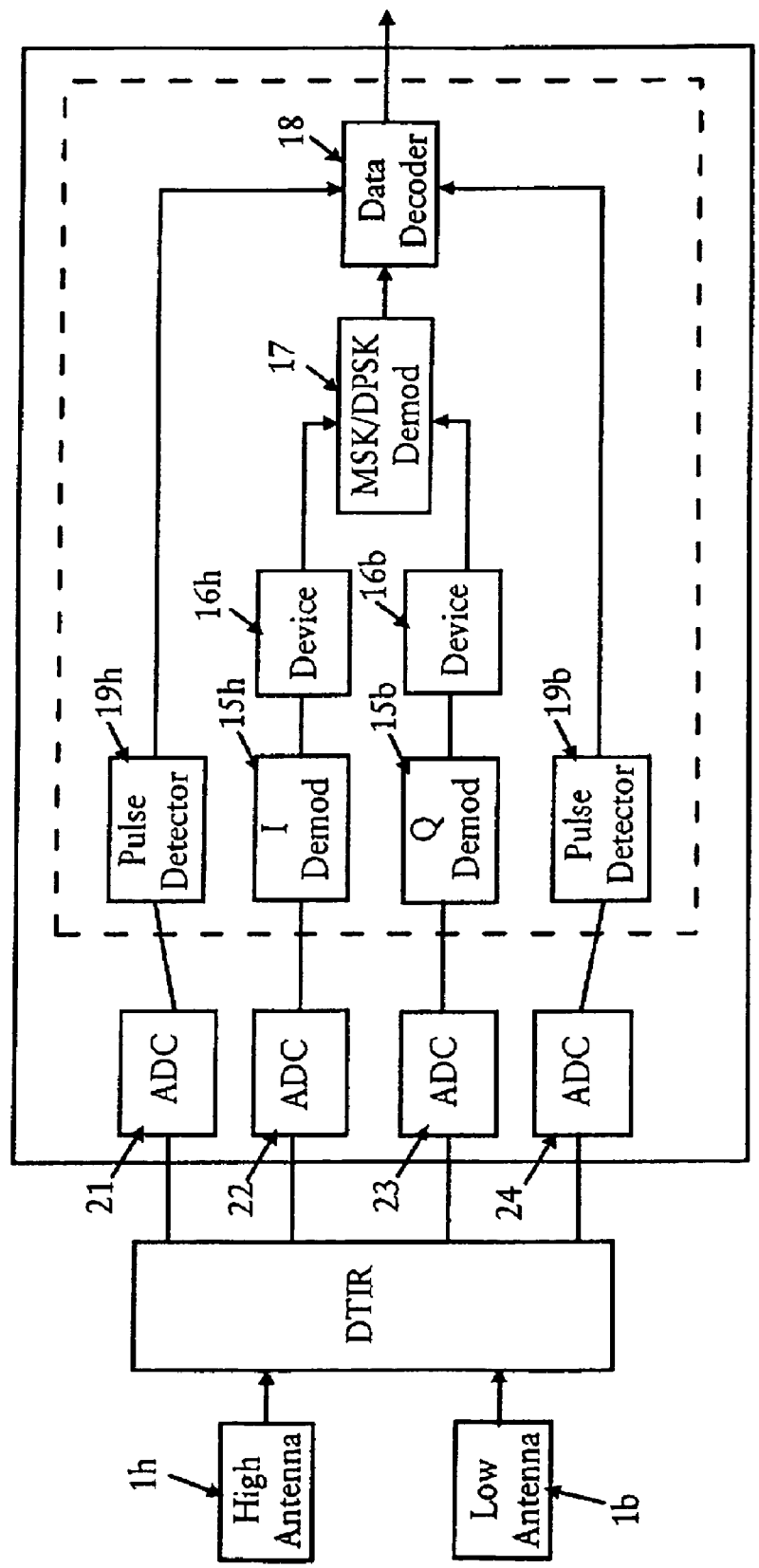
FIG. 4 shows an alternative embodiment of FIG. 3.

FIG. 4 shows a variant of FIG. 3 in which the comparator (14h, 14b) is replaced by an ADC (analog-digital converter) that works with its own sampling clock determined in the same way as the one explained here above.

Each of the analog signals $S_{vh}$, $S_{dh}$, $S_{vb}$, $S_{db}$ received by the high and low antennas is transmitted to an ADC 21, 22, 23, 24 adapted to converting it into a digital signal. This digital signal is then processed in a manner identical to that described when a comparator is used.

To put it briefly, the two video signals $S_{vh}$ and $S_{vb}$ are sampled by means of the two ADCs 21, 24 before being transmitted to the data decoder 18.

The signals containing the payload information $S_{dh}$ and $S_{db}$ are converted into digital signals by the ADCs 22, 23, at a sampling frequency Fe, and then transmitted to an 1, Q type demodulator respectively referenced 15*h*, 15*b*, sampled at a frequency Fe. They are then filtered in appropriate devices 16*h*, 16*b* and then transmitted to an MSK/DPSK type demodulator 17.

The video and data signals are then transmitted to the data decoder 18 which gives the initial signals received by the antennas.

In the different alternative embodiments, the processing card may be set up by means of a FPGA (Field-programmable Gate Array) or an ASIC (Application Specific Integrated Circuit).

What is claimed is:

1. A method for decoding of a signal in an interrogation/response type of communications system, a received signal being formed by a video signal $S_{vh}$, $S_{vb}$ and a signal $S_{dh}$, $S_{db}$ containing the data said signals respectively corresponding to the signals received at the high antenna 1*h* of the receiver and at the low antenna 1*b* of the receiver of an IFF (identification Friend or Foe) said data signal being a MSK (Minimum Shift Keying), FSK (Frequency Shift Keying) or DPSK (Differential Phase-Shift Keying) modulated signal wherein the method comprises the following steps:

signals $S_{dh}(Fl)$, $S_{db}(Fl)$ converting the intermediate frequency analog signals into a digital signals, by using a comparator having a threshold set as a function of the $S_{dh}(Fl)$, $S_{db}(Fl)$ signals;

sampling the digital signals signals $S_{eh}$, $S_{eb}$ at a given frequency Fe to obtain $S_{eh}$, $S_{eb}$, then sending the signals $S_{eh}$, $S_{eb}$ to a filter adapted to readjusting the frequency of the sampled signals $S_{eh}$, $S_{eb}$ towards a frequency included in the frequency band of the initial signals $S_{dh}(Fl)$, $S_{db}(Fl)$;

transmitting the video signals $S_{vh}$, $S_{vb}$ to pulse detectors; and transmitting the sampled and filtered signals $S_{eh}$, $S_{eb}$ as well as outputs of the pulse detectors to a processing step so as to determine the initially received signal to a demodulating step adapted to produce original binary of the signal.

2. The method according to claim 1, wherein the value of the sampling frequency Fe is such that, for each signal sample, the phase state is different during a binary period.

3. A system for decoding of a signal in an interrogation/response type of communications system comprising a receiver adapted to convert the received signal formed by a video signal $S_{vh}$, $S_{vb}$ into a video signal and an intermediate frequency analog signal, a signal $S_{dh}$, $S_{db}$ containing a data, said signals respectively corresponding to the signals received at the high antenna 1*h* of the receiver and at the low antenna 1*b* of the receiver of an IFF (identification Friend or Foe), data signal being a MSK (Minimum Shift Keying), FSK (Frequency Shift Keying) or DPSK (Differential Phase-Shift Keying) modulation wherein the system comprises:

a comparator having a threshold set as a function of the intermediate frequency analog signal, the comparator adapted to convert the intermediate frequency analog signal into a digital signal, a device enabling the digital signal to be sampled at a frequency Fe, pulse detectors configured to analyze video signals $S_{vh}$, $S_{vb}$; and a device for processing the sampled digital signal and the analyzed video signals to determine the initially received signals.

4. The system according claim 3 wherein, the sampling device is an I, Q demodulator.

\* \* \* \* \*